United States Patent [19]

Hukari

[11] Patent Number: 5,927,921
[45] Date of Patent: Jul. 27, 1999

[54] ENHANCED FATIGUE NUT

[75] Inventor: Ronald J. Hukari, Boyertown, Pa.

[73] Assignee: SPS Technologies, Inc., Jenkintown, Pa.

[21] Appl. No.: 08/967,501

[22] Filed: Nov. 11, 1997

[51] Int. Cl.$^6$ ................................................. F16B 37/00
[52] U.S. Cl. .......................................... 411/427; 411/186
[58] Field of Search .................................. 411/917, 427, 411/185, 186, 187

[56] References Cited

U.S. PATENT DOCUMENTS

| | | | |
|---|---|---|---|
| Re. 26,469 | 10/1968 | Beltoise | 411/917 |
| 2,959,204 | 11/1960 | Rigot | 411/186 |
| 3,056,443 | 10/1962 | Knocke | 411/186 |
| 3,933,074 | 1/1976 | Witte et al. | 85/32 T |
| 4,990,044 | 2/1991 | Kimak | 411/427 |

FOREIGN PATENT DOCUMENTS

| | | | |
|---|---|---|---|
| 763619 | 9/1980 | Russian Federation | 411/186 |
| 1668758 | 8/1991 | Russian Federation | 411/186 |
| 875495 | 12/1960 | United Kingdom | 411/427 |

OTHER PUBLICATIONS

Bickford, J.H., "An Introduction to the Design and Behavior of Bolted Joints", Second Edition (Revised and Expanded), Marcel Dekker, Inc., 19–20 and 489–490.
Elastic Stop Nut Corporation of America, "Recent Technological Developments that Significantly Improve Faster Fatigue Performance", *For High Tensile Fastening*, 1962, No. 6226, Section II, 11–17 and 3 sheets of drawings.
Friesth, E.R., "Modern Metric Hardware–Simpler and Better", *Assembly Eng.*, Oct. 1977, 36–40.
Kaynar®, Division of Kaynar Technologies, Inc., "Nut –12 Point, Self–Locking, High Fatigue", Feb. 1, 1995, 2 sheets of drawings.
National Aerospace Standard, Aerospace Association of America, Inc., 1997, NASM1312-11, 1 page.
Precision Fastener Division SPS, "The Asymmetric Thread: Key to greater bolt fatigue strength", Standard Pressed Steel Co., (Form 3228 667–25M–SPS), 1969, 1–7.
Spiralock® Fasteners, Microdot Aerospace Fastening Systems Group, "Technical Manual", 1991, (Form SP16B—Jul. 1991—10M), 1–17.

SpS Fastener Facts, Precision Fastener Division, "Why high–fatigue systems?", Standard Press Steel Co., 1967, Section V.C.1, (Form 3184–1 368–1M–SPS),10 pages.
SpS Fastener Facts, Aerospace Products Division, "Radiused Roots: the enemy of fatigue", Standard Pressed Steel Co., 1967, Section V.C.3, (Form 3184–3 670–1M–SPS), 2 pages.
Yakushev, A.I., "Effect of Manufacturing Technology and Basic Thread Parameters on the Strength of Threaded Connexions", The Macmillan Company, New York, 1964, 31 and 1 sheet of diagram.
Wiegand, H., "The Fatigue Strength of Screw Material and Threaded Connections", Tech. Publ. No. 14 of the firm of Bauer and Schaurte, Neuss, 1934.

*Primary Examiner*—Flemming Saether
*Attorney, Agent, or Firm*—Woodcock Washburn Kurtz Mackiewicz & Norris LLP

[57] ABSTRACT

An enhanced fatigue nut for mating with a threaded mating component includes an exterior surface, a flanged mating end for insertion of a threaded mating component and an end opposing the flanged mating end. Disposed on the interior of the fastener may be a plurality of threads running from the flanged mating end toward the opposing end. The flanged mating end may have a load distributing profile that reduces a limiting stress on the threads of the mating component when the mating component is mated with the enhanced fatigue nut. The flanged mating end may have an end surface, a portion of which is disposed at an angular relationship with a line that is disposed perpendicular with a line that is disposed through the center of the interior of the enhanced fatigue nut. This angled portion creates a gap between the enhanced fatigue nut and another component, such as a washer, so that when the enhanced fatigue nut is mated with the mating component, the enhanced fatigue nut can bend or deflect into the gap and thereby shift the loads on the mating component to reduce the peak limiting stress on the threads of the mating component. This thereby increases the fatigue life of the mating component. The enhanced fatigue nut may also have a groove disposed in the flanged mating end that cooperates with the angled portion of the flanged mating end to reduce the limiting stress on the threads of the mating component.

18 Claims, 7 Drawing Sheets

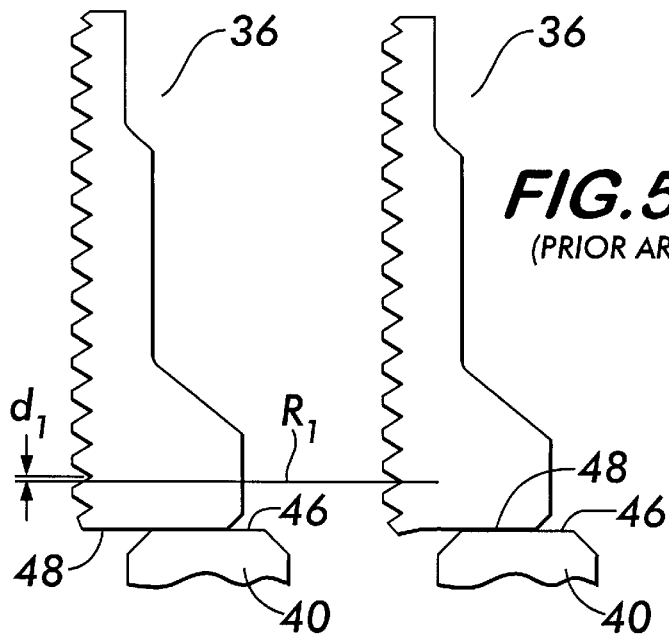
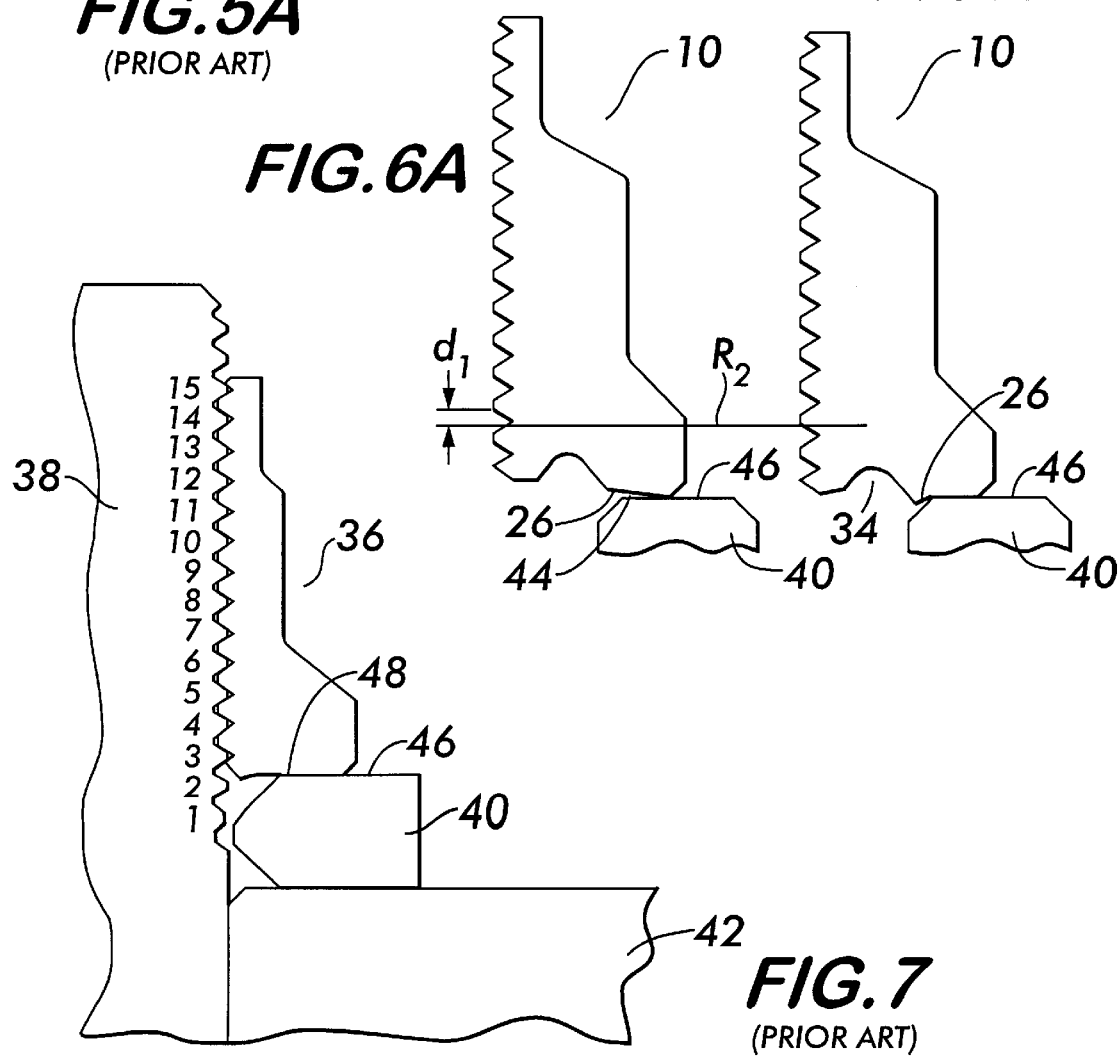
FIG. 5A (PRIOR ART)
FIG. 5B (PRIOR ART)
FIG. 6A
FIG. 6B
FIG. 7 (PRIOR ART)

ENHANCED FATIGUE NUT

BACKGROUND OF THE INVENTION

This invention relates to enhanced fatigue nuts and improved methods for mechanically fastening enhanced fatigue nuts with threaded mating components.

Mechanical fasteners are well known and there are a wide variety of mechanical fasteners. One such type of mechanical fastener is a threaded connector. For example, bolts and nuts are threaded connectors. Fasteners of this type and other types have a wide range of application. One field in which mechanical fasteners, including threaded fasteners, are employed is the aerospace industry. It is particularly important that mechanical fasteners function properly when used in the aerospace industry and other industries because failure of a mechanical connection has the potential to cause not only operational problems, but catastrophic ones as well. There are a wide variety of ways in which mechanical failure of a fastener may occur. Some of the well documented modes of failure of fasteners include brittle failure, fatigue failure, failure in shear, failure due to temperature effects, failure in tension and failure due to stress corrosion cracking. As those skilled in the art will appreciate, one way to reduce the likelihood of failure by any of these modes is to select the proper material for a given loading condition. Another way is to change the load distribution on the fastener by changing the fastener's configuration.

This invention is related to a particular type of fastener, a nut, and to threaded fastening systems employing it. In accordance with this invention, the enhanced fatigue nut is designed to increase the resistance to fatigue failure of a threaded mating component to which the enhanced fatigue nut is mated. The term enhanced fatigue nut signifies that the nut of this invention increases the fatigue life or the resistance to fatigue failure of a mating component to which the enhanced fatigue nut is mated. This is the definition of the term enhanced fatigue nut as it is used in this application. Briefly, it should be understood that when a nut is mated with a mating component, the nut is typically in compression and the mating component is typically in tension.

The fatigue strength of a material is the ability of the material to resist dynamic failure when alternating or fluctuating stresses are applied. Fatigue failure generally occurs when a stress below the ultimate strength and perhaps even below the yield strength of the material is applied repetitively or cyclically to a material. Generally, there are two phases of fatigue failure, crack initiation and crack propagation. Crack initiation refers to the formation of a small crack that is typically microscopic in size. This crack may occur due to a manufacturing defect or at a point of discontinuity in the material, such as where a hole or a thread is disposed. Because stresses concentrate at these cracks, these cracks will slowly propagate as the material is repetitively stressed, and the crack propagation phase of fatigue failure is entered. The probability of crack initiation and the rate of crack propagation is proportional to the alternating stress. After a stress has been applied a certain number of times, the crack may propagate relatively rapidly and sudden failure of the material may occur. This type of failure is known as fatigue failure. Because fatigue failure can occur rapidly and without much advanced warning, it is particularly important to prevent fatigue failure of a material that will be loaded in a repetitive or cyclical fashion. Crack initiation is generally a function of the geometry of a material, while crack propagation is generally a function of the type of material from which the component is manufactured.

Resistance to fatigue failure is typically determined by applying an alternating stress, a stress that alternates between a high and a lower level, to a specimen. By applying the alternating stress, the number of cycles until the material fails at that stress may be determined. The stress at which a material fails for a given number of cycles is commonly referred to as the fatigue strength of the material. Tests can be performed for various loading conditions, and a graph of the fatigue strength verses the number of cycles can be developed. From this graph, the fatigue strength for a given number of cycles can be determined. By maintaining the alternating stress below the fatigue strength for a given number of cycles, fatigue failure of the material may be prevented.

Fatigue failures in correctly designed and manufactured aerospace externally threaded components, such as bolts or studs, undergoing axial loading, typically occur in the thread root. It is the alternating component of the maximum principle stress which is responsible for these fatigue failures. Typically, the failure occurs in the thread root that has the maximum alternating maximum principle stress found in any thread root of the externally threaded component. The maximum alternating maximum principle stress will hereafter be referred to as the limiting stress.

An externally threaded component may also have an endurance limit. The endurance limit is the fatigue strength of the material or the limiting stress below which a material will not undergo fatigue failure, no matter how great the number of applied cycles. Graphically, the endurance limit is generally represented as a plateau on a plot of stress verses the number of cycles. By maintaining the limiting stresses below the endurance limit, fatigue failure of a material may also be prevented.

One way of trying to prevent fatigue failure of a threaded component, such as a bolt or stud, is to change the geometry of the threads on the nut to which it mates. Prior art changes in the geometry of the threads of a mating nut have resulted in some changes in the fatigue life of the mating component. However, changing the thread geometry may not be acceptable to a consumer because threads of new geometry may not have developed industry acceptance and may not meet other accepted standards.

As described above, it is particularly important to prevent failure of mechanical fasteners that are utilized in the aerospace industry because fatigue failure is generally characterized by sudden failure without warning. This invention relates to enhanced fatigue nuts and to improved methods for connecting threaded mating components with the enhanced fatigue nuts to reduce the likelihood of mechanical failure of the threaded mating components. This invention also provides improved methods for mechanically connecting threaded mating components with the enhanced fatigue nuts of the invention which reduce the likelihood of fatigue failure of the threaded mating components. This invention is also related to increasing the fatigue life of a mating component without changing the geometry of the threads of a nut.

SUMMARY OF THE INVENTION

According to one aspect of this invention, an enhanced fatigue nut for mating to a threaded mating component is provided which includes a generally cylindrical body that has an exterior surface and a hollow interior. The enhanced fatigue nut may also have a flanged mating end into which the threaded mating component can be inserted and an opposing end that opposes the flanged mating end. Running along the interior of the enhanced fatigue nut between the flanged mating end and the opposing end may be a plurality of threads. In a preferred embodiment of this invention, there are about fifteen threads disposed between the mating end and the opposing end. The flanged mating end preferably has a load distributing profile, which reduces the limiting stress on the threads of the mating component when the enhanced fatigue nut is coupled to the mating component. By reducing the limiting stress on the mating component, the enhanced fatigue nut increases the fatigue life of the mating component, and overall the fastening systems employing them.

The load distributing profile includes the shape of an end surface of the flanged mating end of the enhanced fatigue nut. As least a portion of the end surface is disposed in an angular relationship with a line that is perpendicular with a line drawn through the center axis of the enhanced fatigue nut. The end surface reduces the limiting stress on at least one of the threads of the mating component. This occurs because at least a portion of the end surface is angled and does not rest smoothly against other mechanical components typically present, such as a washer, as would a flat surface that engages another flat surface. Rather, a gap is created between the angled portion of the end surface and the surface of the other mechanical component. Preferably, the enhanced fatigue nut deflects about the distance of the gap when it is connected to the mating component, such as a bolt. Because of this gap, the flanged mating end of the enhanced fatigue nut can deflect to a greater degree than the flanged mating end of similar nuts that do not have such an angled end surface. This greater deflection causes the load to be more evenly distributed on the threads of the mating component, such that the limiting stress on the threads of the mating component is reduced.

In a preferred embodiment, the load distributing profile may also include a groove that is disposed on the flanged mating end. Preferably, the groove runs circumferentially around the flanged mating end and is located between the threads that are disposed proximal to the flanged mating end and an exterior surface of the flanged mating end. The groove assists the angled portion of the end surface of the flanged mating end in creating a load distributing profile on the flanged mating end that causes the load to be distributed on the threads of the mating component, such that the limiting stress on the threads of the mating component is reduced.

By reducing the limiting stress on the threads of the mating component, the resistance to fatigue failure of the mating component is enhanced. It may be enhanced as much as 25% relative to the mating component's fatigue life when mated with prior art nuts, depending on the size of the nut, the mating component and the stress conditions.

The threads of enhanced fatigue nut and the mating component may be a conventional type of threads and are described in more detail below. Because the threads are conventional, the enhanced fatigue nut can achieve an increased fatigue life of a mating component without a change in thread geometry. Thus, the threads of the enhanced fatigue nut meet industry standards.

Other features of the present invention are described below.

BRIEF DESCRIPTION OF THE DRAWINGS

FIG. 5A is a diagrammatical view of the prior art nut of FIG. 3 in an unmated position;

FIG. 5B is a diagrammatical view of the prior art nut of FIG. 3 in a mated position;

FIG. 6A is a diagrammatical view of a preferred embodiment of FIG. 1 in an unmated position;

FIG. 6B is a diagrammatical view of a preferred embodiment of FIG. 1 in a mated position;

FIG. 7 is a diagrammatical view of the prior art nut of FIG. 3 mated with a mechanical joint;

DETAILED DESCRIPTION OF THE INVENTION

Figure 1:
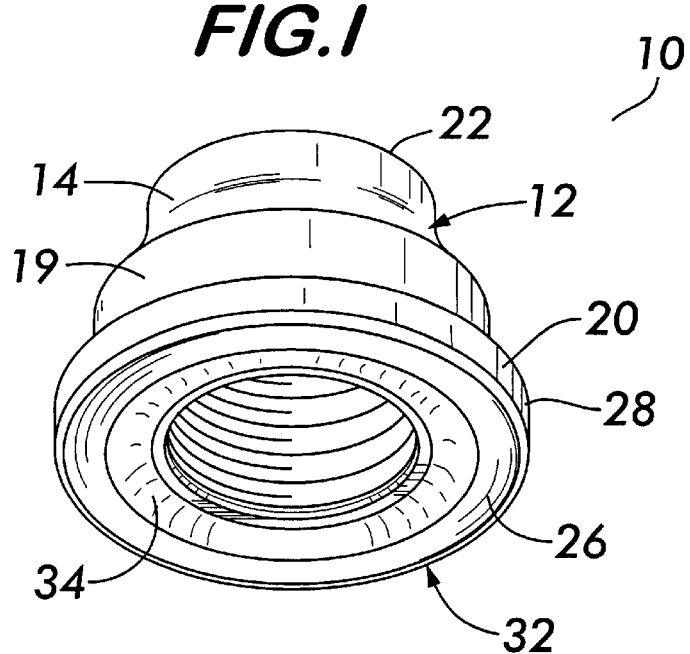
FIG. 1 is an isometric view of a preferred embodiment of an enhanced fatigue nut of this invention.
Figure 2:
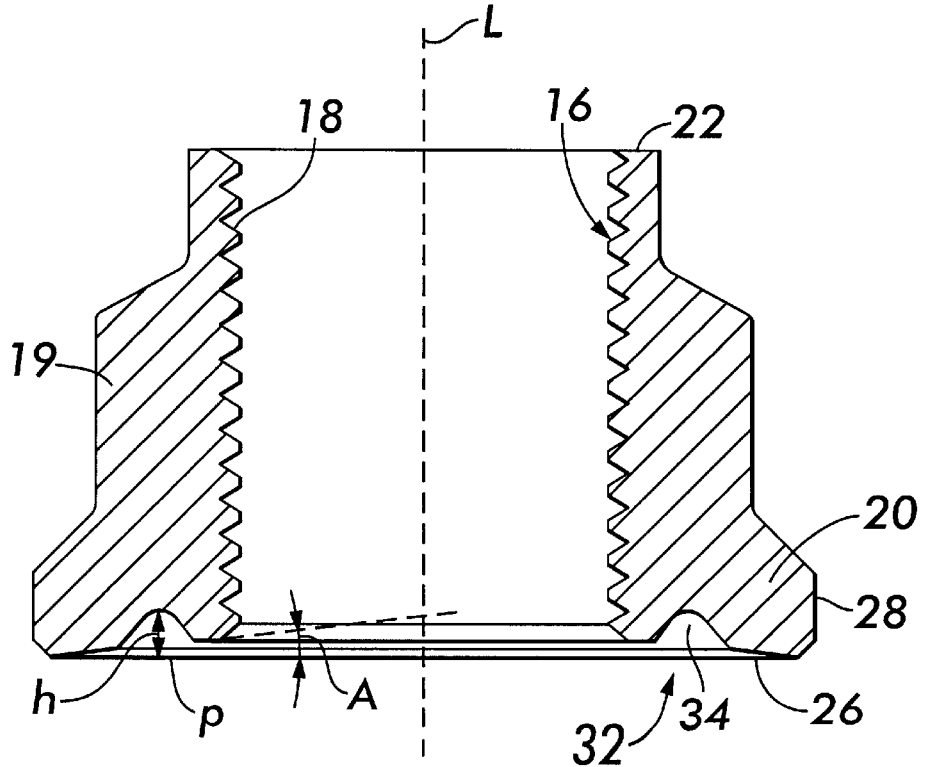
FIG. 2 is a cross sectional view of a preferred embodiment depicted in FIG. 1.

FIGS. 1 and 2 depict an enhanced fatigue nut 10 according to a preferred embodiment of this invention. This enhanced fatigue nut 10 may have a wide variety of applications. One application of the enhanced fatigue nut 10 is in the aerospace industry. The enhanced fatigue nut 10 is designed to reduce the limiting stress on a mating component that is mated with the enhanced fatigue nut and thereby increase the mating component's resistance to fatigue failure. The enhanced fatigue nut 10 is also designed to reduce the limiting stress on the roots of the threads of the mating component and thereby increase the mating component's resistance to fatigue failure. The enhanced fatigue nut is designed to achieve these results using conventional threads.

As illustrated the enhanced fatigue nut 10 of this invention may have a body 12 that is generally cylindrical in shape. Although this is the preferred shape of the body 12 of the fastener 10, other shapes may be used. The body 12 may have an exterior 14 and an interior 16. The enhanced fatigue nut 10 may have a flanged mating end 20. Preferably, the flanged mating end 20 is integrally formed with the body 12. The flanged mating end 20 preferably has an end surface 26 and an exterior surface 28. At the flanged mating end 20, a mating connector can be inserted into the enhanced fatigue nut 10. The enhanced fatigue nut 10 may have an opposing end 22 which is disposed at the other end of the fastener 10. The opposing end 22 may have a conventional locking feature for locking the enhanced fatigue nut 10 with a mating component, which is described below.

Disposed on the interior 16 of the enhanced fatigue nut 10 may be a fastening means 18 for fastening the enhanced fatigue nut 10 to a mating component. In a preferred embodiment of this invention, the fastening means 18 includes threads running around the interior 16 of the fastener body 12. As with any threads of a nut, these threads may be mated with corresponding threads disposed on a mating component. In a preferred embodiment of this invention, the threads conform to areospace specifications. Even more preferably, the threads are UNJF fine threads which are defined by MIL-S-8879 and are controlled radius root screw threads. Although the enhanced fatigue nut 10 may have any number of threads, the preferred embodiment illustrated in FIG. 2 depicts 15 threads. These threads are numbered sequentially from the flanged mating end 20 to the opposing end 22.

Preferably, the body 12 of the enhanced fatigue nut 10 is manufactured from a ductile fracture tough material. By way of example, some ductile fracture tough materials that may be used to manufacture the enhanced fatigue nut 10 include, but are not limited to, 40 carbon steel, which is generally for 180 ksi. strength applications, H-11 alloy steel per AMS 6487, which is designed for 220 ksi. and 260 ksi. strength applications and Inconel alloy 718, which is also for 180 ksi. and 220 ksi. strength applications.

Disposed on the exterior 14 of the enhanced fatigue nut 10 may be a wrenching feature (not shown). As is conventional, this wrenching feature can be used to mate the enhanced fatigue nut 10 with a mating component 38. The wrenching feature may be disposed on the exterior of the mid-section 19 of the enhanced fatigue nut. This mid-section 19 of the enhanced fatigue nut preferably has a thickness such that it will assist in distributing the loads on the mating component. As will become apparent from the discussion below, by distributing the loads, the thickness of the mid-section assists in minimizing the limiting stress on the mating component.

Figure 2A:
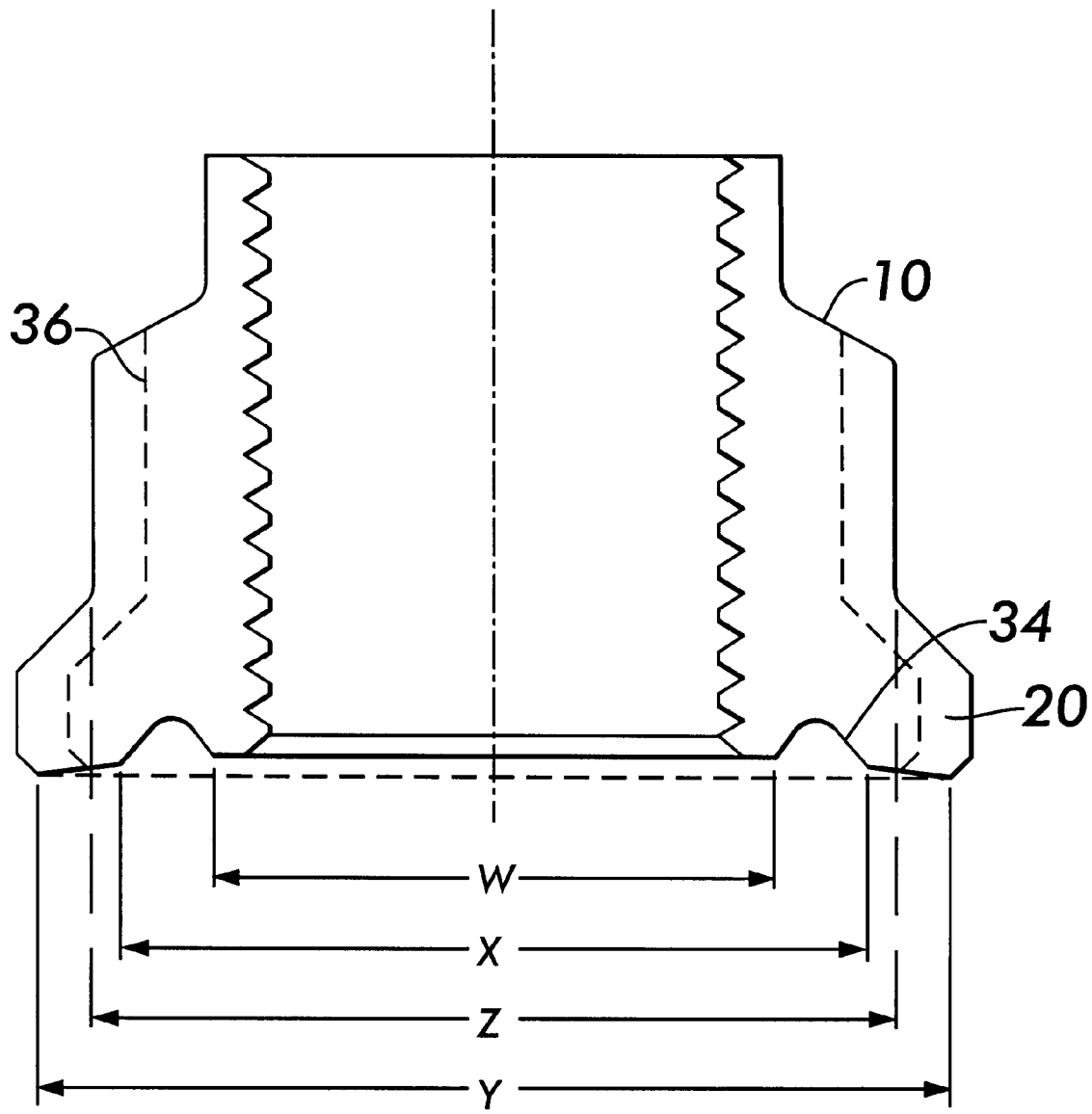
FIG. 2A is a diagrammatical view of a preferred embodiment of FIG. 1 compared to a prior art nut.
Figure 3:
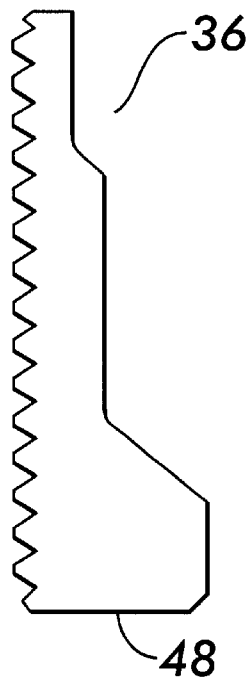
FIG. 3 is a diagrammatical view of a prior art nut.
Figure 4:
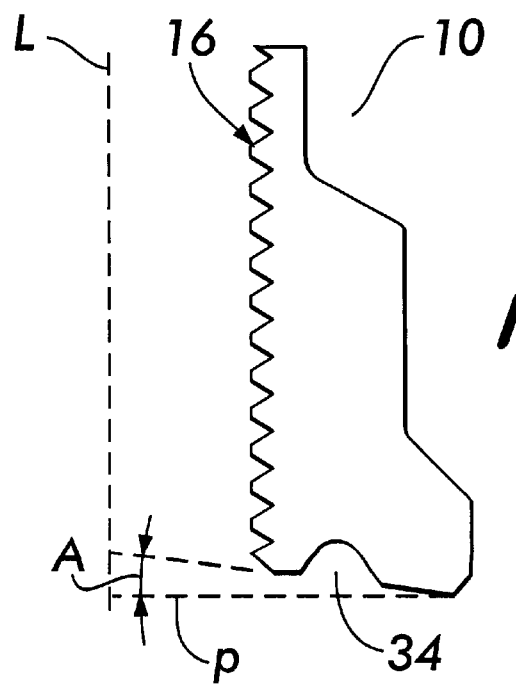
FIG. 4 is a partial diagrammatical view of the preferred embodiment shown in FIG. 1.

Preferably, the enhanced fatigue nut 10 of this invention has a load distributing profile 32. In a preferred embodiment of this invention the load distributing profile 32 includes the shape of the end surface 26 of the enhanced fatigue nut 10. As is best shown in FIGS. 2 and 2a, the end surface 26 is not disposed along the line "P" which is at a right angle to a line "L" drawn through the center of the body 12 of the enhanced fatigue nut 10. Rather, the end surface 26 is disposed in an angular relationship with the line P. In a preferred embodiment of this invention, the end surface 26 is disposed at an angle A of about 2–5° with respect to the line P. The end surface 26 need not be disposed at this angular relationship and may be disposed at a variety of angles. As described below, the angle A at which the end surface 26 is disposed with respect to the line P may be any that causes the loads on the threads of the mating component to be redistributed relative to the load on the mating component when it is mated with prior art nuts and thereby reduces the limiting stress on the threads of the mating component. Furthermore, although the end surface 26 in the preferred embodiment shown is substantially flat, it need not be flat. That is it may be curved or it may have only a portion of which is disposed at an angular relationship with the line P.

As shown in FIGS. 1 and 2, the stress distributing profile 32 may also include a groove 34 that is disposed in the flanged mating end 20 of the fastener 10 and preferably in the end surface 26 of the flanged mating end 20. The groove 34 is preferably disposed proximal to the threads that are disposed proximal to the flanged mating end 20. In a most preferred embodiment of this invention, the groove 34 has a height designated as h in FIG. 2 that extends as high as the second thread of the enhanced fatigue nut. The height of the groove 34 may vary depending on the magnitude of the stress that is to be redistributed on the mating component and the distance that the stress has to be redistributed on the mating component.

The load distributing profile 32 redistributes the load on the threads of a mating component. By redistributing the load on the threads of the mating component, the enhanced fatigue nut decreases the peak limiting stress and increases the resistance to fatigue failure of the mating component. The preferred embodiment of the load distributing profile 32 shown distributes the stresses to increase the fatigue strength of the mating component 10 as described below.

The enhanced fatigue nut of this invention has dimensional relationships that have been designed to ensure that the mating component to which the enhanced fatigue nut is mated has an increased fatigue life. Some of these relationships are as follows and are referenced to the nominal thread diameter. The nominal thread diameter is the designation used for general identification and is the same as the major diameter of the threads, or the diametrical distance between the crest of the threads. Actual dimensions will vary from the nominal dimensions based on manufacturing tolerances. The value of the dimension W is preferably between about the nominal thread diameter of the enhanced fatigue nut and nominal thread diameter of the enhanced fatigue nut plus two thread pitches of the enhanced fatigue nut. The value of the dimension X is preferably between about the nominal thread diameter plus 3 thread pitches of the enhanced fatigue nut and the nominal thread diameter plus five thread pitches of the enhanced fatigue nut. These dimensions define the location of the groove 34 on the flanged mating end 20 by defining its inner and outer diameters. The groove is preferably disposed in between the dimensions W and X.

The minimum value of the dimension Y, the outer diameter of the bearing surface (end surface), is preferably a dimension that creates a bearing surface area that is about equal to 140% to 200% of the area created by the nominal thread diameter. The bearing surface area is that portion of the end surface 26 that rests or bears against another mechanical component, such as a washer, as depicted in FIGS. 6B and 7. The maximum value of Y is generally imposed by design constraints and application, such as the size or diameter of the component against which the end surface rests. Dimension Z is the theoretical diameter of the mid-section 19 of the enhanced fatigue nut 10, and it is preferably a dimension that creates a cross-sectional area of the mid-section 19 that is between about 75% to 125% of the area of the nominal thread diameter. The dimension 7 is important in defining the cross-section of the mid-section 19 of the enhanced fatigue nut 10, which as described below, effects the compression of the threads of the enhanced fatigue nut when mated with a mating component and therefore, the limiting stresses on the mating component. The maximum value of dimension Z is also imposed by design constraints and applications.

Although the operation of the enhanced fatigue nut 10 is described below, one application of the enhanced fatigue nut is provided in order that the operation of the enhanced fatigue nut may be better understood. FIG. 7 illustrates diagrammatically an application of a prior art nut 36. In this Figure, the prior art nut 36 is mated to a mating component 38, which is depicted as a threaded bolt. Although the mating component 38 is preferably a bolt, it need not be and may take the form of a variety of other threaded fasteners, such as a stud. A washer 40 and a joint 42 are also depicted schematically in FIG. 7. As shown, the threads of the prior art nut may be mated with the threads of the mating component 38. The washer 40 can be disposed and compressed between the joint 42 and the prior art nut 36 to provide a secure fitting. Although not shown, it will be appreciated that the enhanced fatigue nut 10 of this invention can be attached to a similar mating component 38, a washer 40 and a joint 42 in much the same fashion as the prior art nut 36. However, the load distributing profile 32 of the enhanced fatigue nut 10 of this invention operates with the washer 40, the mating component 38 and the joint 42 to reduce the limiting stress on the threads of the mating component 38.

In order to attach either the prior art nut 36 or the enhanced fatigue nut 10 of this invention to the mating component 38, the washer 40 and the joint 42 the following steps are generally followed. The mating component 38 is aligned with the nut 10, 36 and the washer 40 is disposed between the nut 10, 36 and the joint 42. After aligning the components, the mating component 38 is then fastened to the nut 10, 36 with suitable tools. As these components are mated, the washer 40 is compressed between the nut 10, 36 and the joint 42. Preferably, the nut 10, 36 is affixed to the mating component 38 to achieve a specific preload.

The operation of the enhanced fatigue nut 10 of this invention is best understood by contrasting it with a prior art nut 36. FIG. 5A and 5B respectfully illustrate diagrammatically a portion of the prior art nut 36 unloaded and loaded. In contrast, FIGS. 6A and 6B respectfully depict diagrammatically a portion of the enhanced fatigue nut 10 of this invention unloaded and loaded. The horizontal line $R_1$ through FIGS. 5A and 5B facilitates a comparison of the flanged mating end and the threads of the prior art nut 36 in the unloaded and loaded position. As shown, the bottom most complete thread, thread 2 of the prior art nut, deflects or is bent downward the amount d, when loaded. Although FIG. 5B illustrates thread 2 deflecting downward less than a quarter of a thread length, the actual deflection may be more or less based upon the given loading conditions and the amount of deflection is generally less than that shown. The amount of deflection shown in FIG. 5B is provided for illustrative purposes and for comparison with the enhanced fatigue nut 10 of this invention.

As alluded to above, FIGS. 6A and 6B illustrate the enhanced fatigue nut 10 of this invention when it is unloaded and loaded. Reference line $R_2$ in these Figures illustrates how thread number 3 of the enhanced fatigue nut of this invention responds to a load. As shown, thread number 3 deflects or bends downward the amount $d_2$ when loaded. The amount of deflection $d_2$ is considerably more than a quarter of a thread length. Although, the actual deflection may be more or less than this depending on the loading conditions, and is most likely less than this amount, the importance of the amount of deflection shown is that for a given loading condition, the amount of deflection $d_2$ of the enhanced fatigue nut 10 of this invention is more than the amount of deflection $d_1$ of the prior art nut 36.

The amount of deflection of the enhanced fatigue nut 10 of this invention is greater than the amount of deflection of the prior art nut 36 because of the load distributing profile 32 of this invention. As shown in FIG. 6A, the end surface 26 of the enhanced fatigue nut 10 of this invention does not rest flatly against the washer 40. Rather, because in this embodiment the end surface 26 has a load distributing profile 32 only part of the end surface 26 rests against the washer 40, and a gap 44 is created between the end surface 26 and the washer 40. As the enhanced fatigue nut 10 of this invention is mated with a mating connector 38, a bending moment is placed on the flanged mating end 20. This bending moment pulls the flanged mating end 20 in a counter clockwise direction as viewed in FIGS. 6A and 6B. Because of the gap 44 between the end surface 26 and the washer 40, the flanged mating end 20 has more room to deflect in the counter clockwise direction relative to the flanged mating end of the prior art nut 36. As the flanged mating end 20 deflects, the entire end of the enhanced fatigue nut 10 is bent and is deflected. Eventually, the enhanced fatigue nut 10 and its flanged mating end 20 deflect enough so that at least a portion of the end surface 26 rests flat against the washer surface 46, as shown in FIG. 6B.

As the flanged mating end 20 deflects, the threads of the enhanced fatigue nut also deflect. The threads deflect relative to the threads of the mating component 38. By moving the threads of the enhanced fatigue nut 10 relative to the threads of the mating component 38, the loads on the threads of the mating component 38 are redistributed. This redistribution of the load on the threads of the mating component causes the limiting stress on the mating component to be reduced and thereby increases the resistance to fatigue failure of the mating component.

The bending of the enhanced fatigue nut 10 of this invention should be contrasted with the bending of the prior art nut 36. The prior art nut 36 also has a flanged mating end that has an end surface 48. In contrast, to the end surface 26 of the enhanced fatigue nut 10 of this invention, the end surface 48 of the prior art nut 36 rests against the washer surface 46 in the unloaded position, as shown in FIG. 5A. Similarly to the enhanced fatigue nut 10 of this invention, the flanged mating end of the prior art nut 36 also undergoes a bending moment when it is loaded. However, because the end surface 48 of this prior art nut 36 rests flatly against the surface 46 of the washer 40, the flanged mating end of the nut 36 cannot deflect as far as the flanged mating end of the enhanced fatigue nut 10. As shown, the end surface 48 of the prior art nut 36 may deflect below the mating point of the end surface 48 and the surface 46 of the washer 40, but the end surface 48 cannot deflect as much as that of this invention because there is no gap 44 between the end surface 48 and the washer 40. Alternatively stated, because of the angled end surface 26 of this invention, a gap 44 is created in between the end surface 26 and the washer 40 so that the enhanced fatigue nut 10 and its flanged mating end can deflect the distance of this gap 44.

Similar to the threads of the enhanced fatigue nut 10, the threads of the prior art nut also deflect as the flanged mating end of the prior art nut deflects. However, because of the decreased amount of deflection of the flanged mating end of the prior art nut, the threads of the prior art nut also deflect to a lesser extent than do the threads of the enhanced fatigue nut 10. It is this greater deflection of the flanged mating end 20 and the threads of the enhanced fatigue nut 10 of this invention 10 for a given load that causes the loads on the threads of the mating component 38 to be distributed relative to the stresses on the mating component 38 when it is mated with the prior art nut 36. This occurs because as the threads of the enhanced fatigue nut 10 deflect, the loads are distributed towards the threads disposed toward the center of the mating component 38 and away from the threads disposed proximal to the end of the mating component 38. Under this type of load distribution created on the mating component 38 by the enhanced fatigue nut 10 of this invention, the peak limiting stress on the threads of the mating component 38 is reduced. By reducing the peak limiting stress, the resistance to fatigue failure of the mating component is increased. In contrast, the deflection of the prior art nut 36 is restricted and this results in a higher peak limiting stress on the threads of the mating component.

The groove 34 of the enhanced fatigue nut 10 of this invention functions to limit the deflection of the threads proximal to the mating end 20 of the enhanced fatigue nut 10. Because of the groove 34, the threads deflect less than they would if the groove 34 was not there. Without the groove 34, the first few threads may deflect to such a degree that they become completely unloaded. With the groove 34, however, the first few threads carry some load and assist in redistributing the stress on the threads of the mating component 38. Moreover, the groove 34 functions to assist in the redistribution of the load on the threads of the mating component 38 so that the peak limiting stress on the threads of the mating component is reduced relative to the limiting stress achieved when the mating component is mated with the prior art nut 36.

In summary, the enhanced fatigue nut 10 of this invention has a load distributing profile 32 which enables the enhanced fatigue nut 10 and its flanged mating end 20 and threads to deflect more for a given load than a prior art nut 36 and its flanged mating end and threads. In the embodiment shown, the load distributing profile 32 includes the angled end surface 26 and the circumferential groove 34 disposed in the end surface 26. The end surface 26 creates a gap 44, which the prior art fastener does not, into which the enhanced fatigue nut 10 and its threads can deflect. This increases the deflection of the flanged mating end 20 and the threads and thereby redistributes the load on the mating component to reduce the peak limiting stress on the threads of the mating component.

As described above, the enhanced fatigue nut 10 may also have a mid-section 19 that is of a preferred thickness. This preferred thickness of the mid-section 19 is thicker than that of the prior art nut 36, and it assists in reducing the limiting stress on the threads of the mating component 38. By creating a relatively stiff mid-section 19, the flanged mating end 20 will carry less load than it would without a stiff mid-section 19. This permits the flanged mating end 20 and the threads to deflect enough to reduce the peak limiting stress on the mating component.

Figure 10:
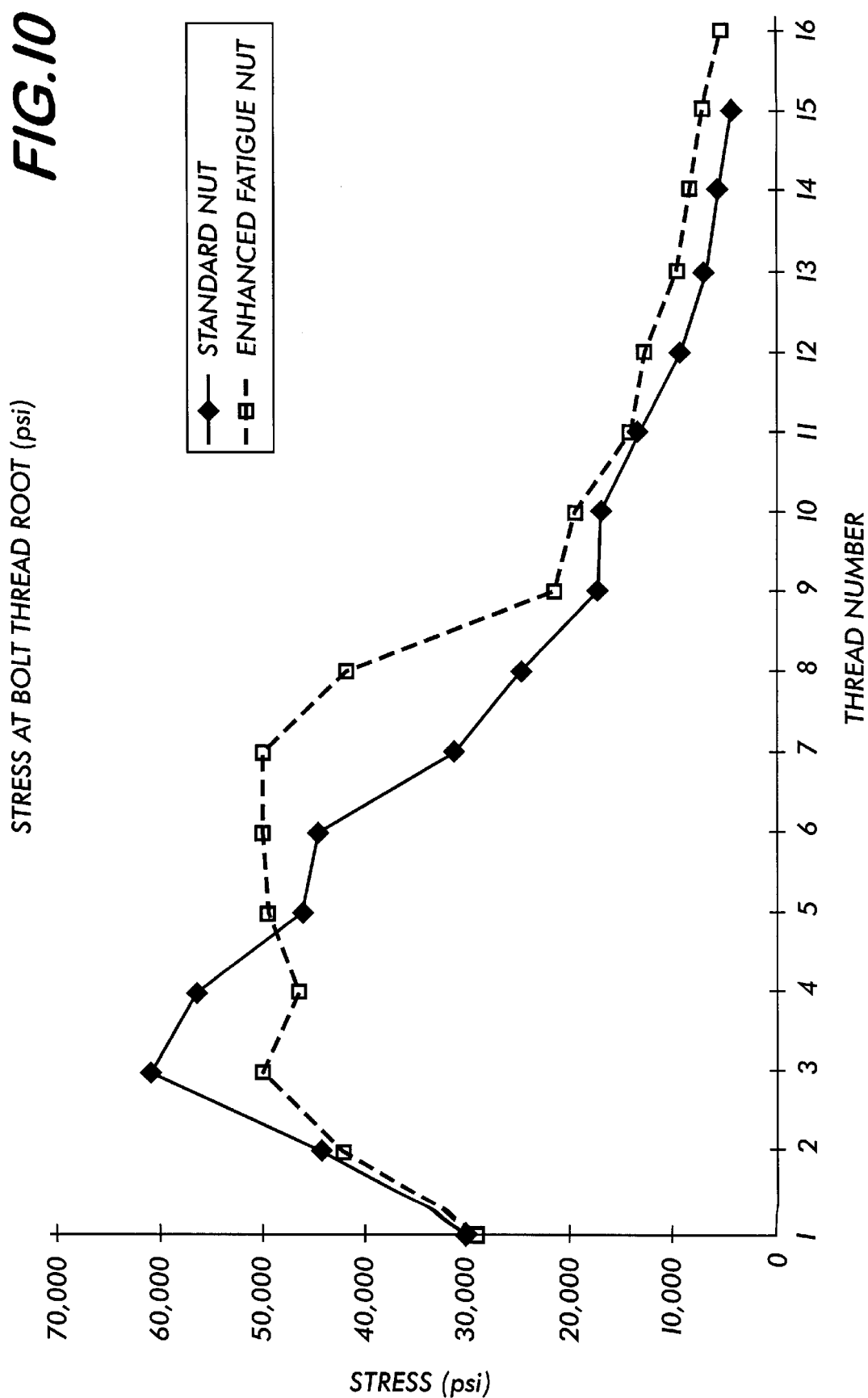
FIG. 10 is a graph depicting the limiting stress on the threads of the mating component when mated with a prior art nut and the embodiment depicted in FIG. 1.

The effect of the load distribution profile 32 of this invention is better understood with reference to FIG. 10, which compares the limiting stress on the roots of the threads of the mating component 38 when it is mated with an enhanced fatigue nut 10 of this invention with the limiting stress on the roots of the threads of the mating component when it is mated with a prior art nut 36. As described above, the roots of the threads are the area in which fatigue failure is a concern. These curves may be referred to as the limiting stress curves, and they were were generated using conventional finite element analysis and a given loading condition according to MS14163 for a ⅜ in. diameter mating component in the form of a bolt. The diamond shapes indicate the limiting stress on the mating component when it is mated with the prior art nut 36, and the square shapes indicate the limiting stress on the mating component when it is mated with the enhanced fatigue nut 10 of this invention.

There is an ideal limiting stress curve for the threads of the mating component 38. Ideally, the limiting stress curve is relatively flat and a horizontal line between the threads of the mating component that are mated with a nut. However, because the nut may have a locking feature, the ideal curve may be modified somewhat. That is, if the nut to which the mating component is mated has a locking feature, the limiting stress curve should drop off and show a decrease in the stresses of the threads that are mated with threads that form part of the locking feature of the nut. Since the enhanced fatigue nut 10 and the prior art nut 36 both preferably have locking features disposed at the opposing end, the ideal limiting stress curve is a horizontal line until the threads that are part of the locking feature are reached, and then the stress should decrease in magnitude.

The following is a discussion of the limiting stress on the threads of the mating connector 38 when it is mated with the prior art nut 36. As is illustrated the stress on thread number 1 is about 30,000 psi. From thread number 1, the limiting stress increases and has a value of about 44,000 psi. at thread number 2 and a value of about 62,000 psi. at thread number 3. The limiting stress at thread number three is a peak value. After thread number 3, the limiting stress generally gradually decreases until thread number 15 and is relatively flat between threads 3 and 7.

The shape of the curve of the limiting stress when the mating component is mated with a prior art nut 36 should be contrasted with the ideal stress distribution plot described above. Rather then having a relatively flat or even stress distribution on the threads of the mating connector, the limiting stress is relatively uneven and has a peak or maximum value. In summary, when the mating component is mated with the prior art nut, the stress on thread 3 is high relative to the ideal stressing conditions. Additionally, the peak limiting stress occurs at about thread number three and has a relatively high value.

As can be seen by examining the limiting stress curve, the limiting stress distribution, the limiting stress distribution on the mating component 38 when it is mated with the enhanced fatigue nut 10 does not have a "peak" stress akin to the peak stress on thread number 3 of the mating component when it is mated with the prior art nut. Rather, the stress distribution is generally curved, and the "peak" limiting stress occurs on about threads 3–7 and has a value of about 50,000 psi. Thus, the stress on thread numbers three and four has been reduced relative to the stress on the corresponding threads on the mating component 38 when it is mated with a prior art nut 36. The exact value of the stress on the threads of the mating component 38 when it is mated with either the enhanced fatigue nut 10 or the prior art nut 36 may vary. However, the important concept is that for a given loading condition, the peak limiting stress on any thread root of the mating component 38 is reduced when it is mated with the enhanced fatigue nut 10 in comparison to the limiting stresses on the mating component 38 when it is mated with the prior art nut 36.

Figure 8:
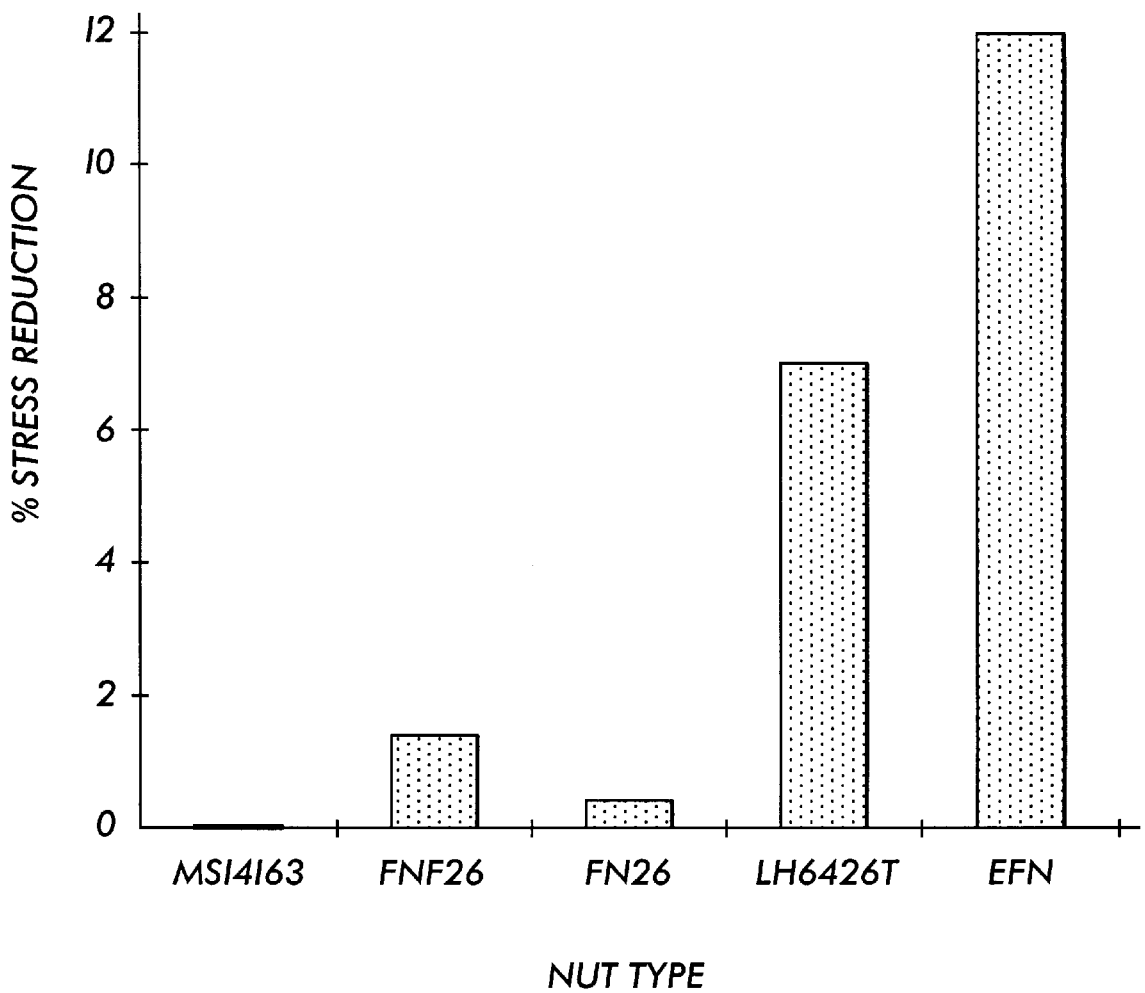
FIG. 8 is a graph comparing the performance of the embodiment of FIG. 1 with prior art nuts.

Because of the reduced peak limiting stress on the mating component 38 when it is mated with the enhanced fatigue nut 10 of this invention, the fatigue life or resistance to fatigue failure of the mating component 38 is enhanced. This is best seen by examining FIGS. 8 and 9. FIG. 8 illustrates a comparison of the amount of stress reduction, measured in percent, of the mating component 38 when it is mated with various prior art nuts and with the enhanced fatigue nut 10 of this invention. The prior art nut shown are also manufactured by the assignee of this invention, SPS Technologies, and have the designations MS14164, FNF26, FN26 and LH6426T. The enhanced fatigue nut 10 of this invention is labeled as EFN (Enhanced Fatigue Nut) in FIG. 8. The nut designated as MS14164 is the industry standard nut that is currently used in applications in which the enhanced fatigue nut 10 may be used. Although the enhanced fatigue nut 10 may have other applications, it is intended to replace the MS14164 nut. As shown, the enhanced fatigue nut 10 yields about a 12% reduction in the limiting stress on the mating component 38 relative to the industry standard nut MS14163 that is was designed to replace. The enhanced fatigue nut 10 also yields about more than a 4% reduction on the amount of limiting stress over the LH6426T nut, which is one of the best efforts known to the inventor at reducing the limiting stress on the mating component 38. These improvements were achieved using a ⅜ in. enhanced fatigue nut. As alluded to above, as much as a 25% improvement has been obtained relative to prior art ¾ in. nuts when a ¾ inch enhanced fatigue nut is employed.

Figure 9:
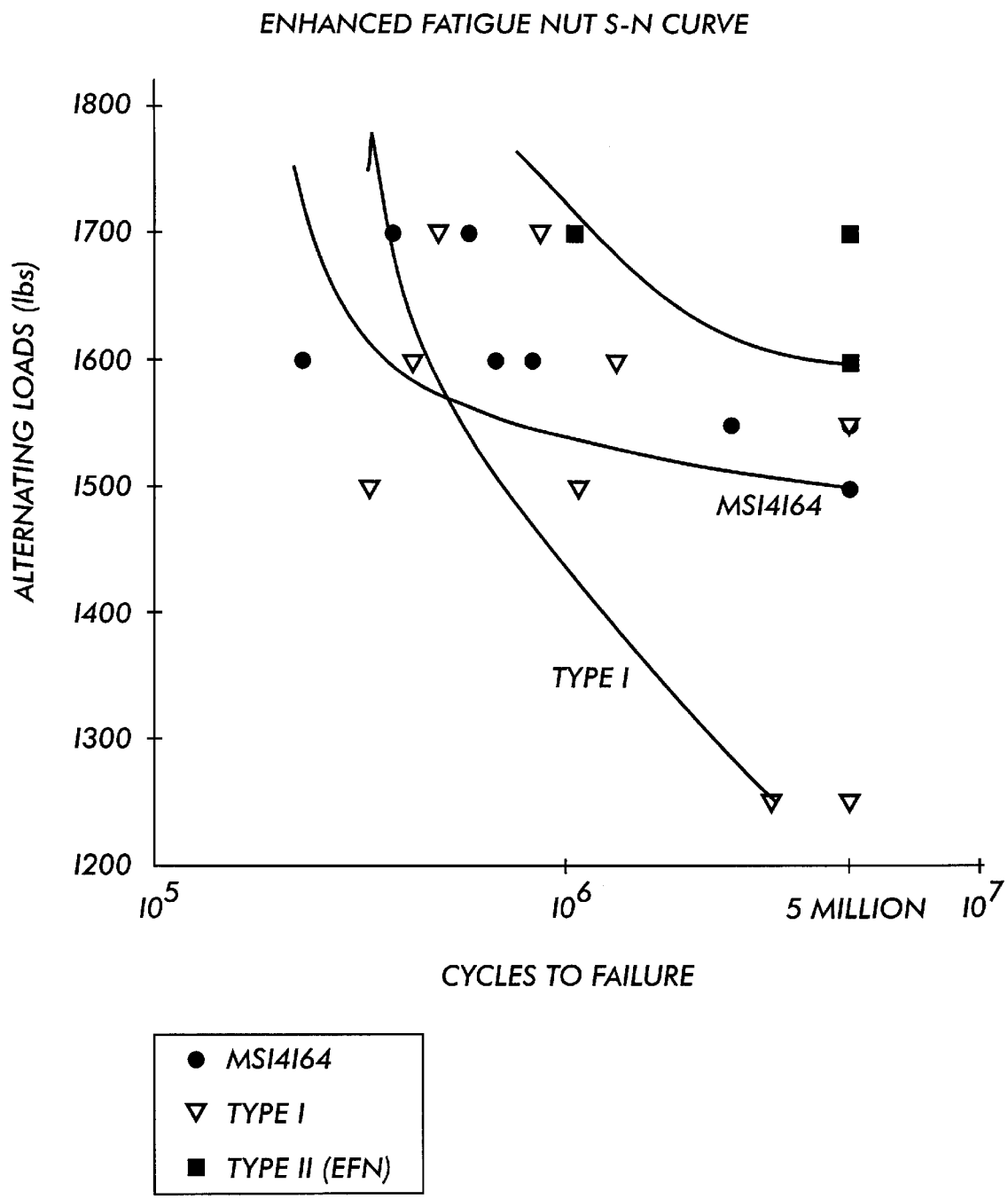
FIG. 9 is a graph depicting the fatigue strength of a mating component mated with the embodiment of FIG. 1 and other prior art nuts.

FIG. 9 illustrates a standard S-N graph, a graph of the alternating load per MIL-STD-1312 test 11A on the mating component 38 verses the cycles to failure when mated with the enhanced fatigue nut 10 and other prior art nuts. On the graph, a best fit curve is shown for the mating component 38 when mated with each of the nuts. The curve between the square points denotes the alternating load on the mating component 38 when mated with the enhanced fatigue nut 10. The curves between the dots and the triangles represent the S-N curves for the prior art fasteners denoted as MS14164 and "TYPE 1" respectively. As shown for a given alternating load, the mating component 38 will undergo more cycles until failure occurs when mated with the enhanced fatigue nut 10 and therefore, it has a higher fatigue strength. Similarly, for a given number of cycles the magnitude of the alternating load needed to produce fatigue failure of the mating component 38 when mated with the enhanced fatigue nut 10 is higher. The mating component may reach an endurance limit of about 5,000,000 cycles when mated with the enhanced fatigue nut 10. As described above, the limiting stress and therefore the likelihood of fatigue failure of the mating component is reduced when it is mated with the enhanced fatigue nut 10 because of its load distributing profile. The increased stiffness of the mid-section 19 of the enhanced fatigue nut 10 also assists in increasing the mating component's increased resistance to fatigue failure.

Table 1 lists the test results of tests conducted on the mating component 38 when mated with various prior art nuts and the enhanced fatigue nut 10. These tests were conducted according to military specification sheet number MS14490 C, covering 220 ksi. INCO 718 wheel bolts. Bolts defined according to MS 14490-06020 produced at SPS and washers defined according to MS 14177-6 were used in these tests. These tests were also conducted by cyclically applying a high and a low load and the ratio R of the low to the high load was 0.85

The prior art nuts that were used for comparison include MS 14491-06, which is the standard nut used in applications in which the enhanced fatigue nut of this invention may be used, and MIL-STD-1312 FTN-B, which is a standard fatigue test nut. As shown in the table, the cycles to failure of the mating component 38 were greatly increased when it was mated with the enhanced fatigue nut 10. When mated with the industry standard MS 14491-06 nut, the mating component 38 failed for a given loading condition before 1,000,000 cycles was achieved on 11 of 14 tests conducted. When mated with the MIL-STD-1312 FTN-B nut, the mating component 38 underwent 1,000,000 cycles and did not fail. In contrast, when the mating component 38 was mated with the enhanced fatigue nut 10, the mating component, underwent 2,000,000 cycles and did not fail.

| TYPE OF FASTENER v. CYCLES TO FAILURE[1] | | |
|---|---|---|
| MS14491-06 | MIL-STD-1312 FTN-B | EFN |
| 775,000 | 1,200,000 NF | 2,000,000 NF |
| 503,000 | 1,200,000 NF | 2,000,000 NF |
| 729,000 | 1,200,000 NF | 2,000,000 NF |
| 877,000 | 1,054,000 NF | |
| 648,000 | 1,283,000 NF | |
| 1,000,000 NF | 1,709,000 NF | |
| 1,000,000 NF | | |
| 964,000 | | |
| 778,400 | | |
| 1,319,100 | | |
| 877,000 | | |

-continued

| TYPE OF FASTENER v. CYCLES TO FAILURE[1] | | |
|---|---|---|
| MS14491-06 | MIL-STD-1312 FTN-B | EFN |
| 557,000 | | |
| 511,000 | | |
| 706,000 | | |

[1]The designation "NF" indicates that the tests were discontinued prior to failure.

Tables 2 and 3 compare more test data achieved with the enhanced fatigue nut and a prior art nut. These tests were conducted at a ratio of 0.45 between the high and the low load under various loading conditions. Table 2 discloses the test data achieved with a prior art nut, and Table 3 discloses the test data achieved with the enhanced fatigue nut 10. As shown, the mating component failed at a higher number of cycles for a given loading condition when it was mated with the enhanced fatigue nut for each loading condition.

TABLE 2

BOLT: MS14163-06026
NUT: MS14164-06
WASHER: MS14177-6

| TEST | LOAD MAX | LOAD MIN | R | CYCLES | FAILURE LOCATION |
|---|---|---|---|---|---|
| 1 | 19.86 | 8.937 | .45 | 6789 | THREADS |
| 2 | 19.86 | 8.937 | .45 | 7873 | THREADS |
| 3 | 19.86 | 8.937 | .45 | 8235 | THREADS |
| 4 | 20.2 | 9.09 | .45 | 7456 | THREADS |
| 5 | 20.2 | 9.09 | .45 | 5723 | THREADS |
| 6 | 20.63 | 9.2835 | .45 | 5887 | THREADS |
| 7 | 20.63 | 9.2835 | .45 | 5136 | THREADS |
| 8 | 18.0 | 8.1 | .45 | 11537 | THREADS |
| 9 | 18.0 | 8.1 | .45 | 11491 | THREADS |
| 10 | 16.5 | 7.425 | .45 | 32222 | THREADS |
| 11 | 16.5 | 7.425 | .45 | 21205 | THREADS |

TABLE 3

ENHANCED FATIGUE NUT OF THIS INVENTION

BOLT: MS14163-06026
NUT: 94861-624
WASHER: MS14177-6

| TEST | LOAD MAX | LOAD MIN | R | CYCLES | FAILURE LOCATION |
|---|---|---|---|---|---|
| 1 | 19.86 | 8.937 | .45 | 8292 | THREAD |
| 2 | 19.86 | 8.937 | .45 | 16325 | HEAD |
| 3 | 19.86 | 8.937 | .45 | 10069 | THREAD |
| 4 | 20.2 | 9.09 | .45 | 8342 | THREAD |
| 5 | 20.2 | 9.09 | .45 | 9100 | THREAD |
| 6 | 20.63 | 9.2835 | .45 | 8302 | THREAD |
| 7 | 20.63 | 9.2935 | .45 | 7511 | THREAD |
| 8 | 18.0 | 8.1 | .45 | 27577 | HEAD |
| 9 | 18.0 | 8.1 | .45 | 16019 | THREAD |
| 10 | 16.5 | 7.425 | .45 | 50405 | THREAD |
| 11 | 16.5 | 7.425 | .45 | 77148 | HEAD |

In summary, this invention includes an improved enhanced fatigue nut 10 that has a load distributing profile 32. In a preferred embodiment, the load distributing profile 32 includes an end surface 26 at least a portion of which is disposed at an angle relative to a line that is perpendicular to a line through the center of the fastener 10. The load distributing profile 32 may also include a groove 34 disposed in the end surface 26. Because of the angled portion of the end surface 26 of the fastener 10, the end surface 26 does not rest uniformly against the surface to which it mates and a gap 44 is created between the end surface 26 and the mating surface. When the enhanced fatigue nut 10 is connected to a mating component, the flanged mating end 20 and the threads of the enhanced fatigue nut 10 deflect or bend due to the presence of the gap 44 more than they would in a prior art nut 36 that does not have a load distributing profile 32. This increase in the bending permits the peak limiting stress on the threads to be reduced relative to the peak limiting stress of mating components mated with prior art nuts. The increased cross-section of the mid-section 19 of the enhanced fatigue nut 10 provides greater stiffness to facilitate achieving a proper load distribution and reduction of the peak limiting stress on a mating component.

By reducing the limiting stress, the enhanced fatigue nut 10 increases the fatigue life of the mating component. As mentioned above, although this invention may have a wide variety of applications, one application of this invention is in the aerospace industry in which it can replace the prior art nut denoted as MS14164. Because the enhanced fatigue nut 10 has conventional threads, it achieves an increase in the fatigue life of a mating component without changing the thread geometry. This is significant because if the thread geometry was changed, commercial acceptance of the enhanced fatigue nut may be diminished because new standards would have to be developed for the new threads.

It is to be understood, however, that even in numerous characteristics and advantages of the present invention have been set forth in the foregoing description, together with details of the structure and function of the invention, the disclosure is illustrative only, and changes may be made to detail, especially in matters of shape, size and arrangement of parts within the principles of the invention to the full extent indicated by the broad general meaning of the terms in which the appended claims are expressed.

What is claimed is:

1. An enhanced fatigue nut that has an exterior, the nut being for mating with a threaded mating component and for increasing a fatigue life of the mating component by reducing a limiting stress on the threads of the mating component, comprising:
   a threaded cylindrical interior for mating with the threads of the mating component; the interior having a bottom;
   a mating end for insertion of the threaded mating component, the mating end comprising (i) an annular surface that defines an annular groove, the annular surface having a first portion that extends upward from the bottom to a top of the groove and a second portion that extends downward from the top towards the exterior and below the bottom the first and second portions being angled with respect to an axial centerline through the threaded cylindrical interior, and (ii) an angled flanged end that extends from the second portion to the exterior, the angled flanged end being disposed in an angular relationship with the second portion and in an angular relationship with a line that is perpendicular to the axial centerline through the threaded cylindrical interior,
   the groove and the angled flanged end causing the threads of the enhanced fatigue nut to deflect when the enhanced fatigue nut is mated with the mating component and thereby causing the limiting stress on the threads of the mating component to be reduced and increasing the fatigue life of the mating component.

2. The enhanced fatigue nut of claim 1, wherein an inner diameter of the groove is within a range defined by a nominal thread diameter of the enhanced fatigue nut and the nominal thread diameter of the enhanced fatigue nut plus two thread pitches of the enhanced fatigue nut.

3. The enhanced fatigue nut of claim I, wherein an outer diameter of the groove is within a range defined by a nominal thread diameter of the enhanced fatigue nut plus three thread pitches and the nominal thread diameter of the enhanced fatigue nut plus five thread pitches of the enhanced fatigue nut.

4. The enhanced fatigue nut of claim 1, wherein the mating end has an outside diameter that creates a surface area that is within a range of about 140% to 200% of the area defined by a nominal thread diameter of the enhanced fatigue nut.

5. The enhanced fatigue nut of claim 1, wherein the angled flanged end is disposed at an angle in the range of about 2°–5° with the line that is perpendicular to the centerline.

6. The enhanced fatigue nut of claim 1, wherein the enhanced fatigue nut comprises metal.

7. The enhanced fatigue nut of claim 1, further comprising a mid-section disposed between the mating end and an end opposing the mating end, the mid-section having a stiffness relative to a stiffness of the mating end that permits the threads of the enhanced fatigue nut to deflect when mated with the mating component and thereby reduce the limiting stress on the mating component.

8. The enhanced fatigue nut of claim 1, wherein the angled flanged end is disposed at an angle in the range of about 3°–5° with the line that is perpendicular to the centerline.

9. The enhanced fatigue nut of claim 1, wherein the angled flanged end is disposed at an angle in the range of about 4°–5° with the line that is perpendicular to the centerline.

10. An assembly for increasing a fatigue life of a threaded mating component by reducing a limiting stress on the threads of the mating component, comprising:
   an enhanced fatigue nut that has an exterior, the fatigue nut adapted for mating with the threaded mating component, comprising
      (i) a threaded cylindrical interior, the interior having a bottom,
      (ii) a flanged mating end, into which the threaded mating component can be inserted, that includes an annular surface, that defines an annular groove, the annular surface having a first portion that extends upward from the bottom of the interior to a top of the groove and a second portion that extends downward from the top towards the exterior and below the bottom the first and second portions being angled with respect to an axial centerline disposed through a center of the enhanced fatigue nut,
      (iii) the flanged mating end having an angled portion which is angled with respect to a first line that is perpendicular with the axial centerline disposed through the center of the enhanced fatigue nut, and that is angled with respect to the second portion of the annular surface;
   the mating component inserted into the flanged mating end of the enhanced fatigue nut and threaded to the threaded cylindrical interior of the enhanced fatigue nut, the angled portion of the flanged mating end and the groove causing the threads of the enhanced fatigue nut to deflect when the enhanced fatigue nut is mated with the mating component and thereby causing the limiting stress on the threads of the mating component to be reduced and increasing the fatigue life of the mating component; and
   a mechanical component compressed between the flanged mating end of the enhanced fatigue nut and a joint.

11. The assembly of claim 10, wherein the mating component comprises a bolt.

12. The assembly of claim 10, wherein the mechanical component comprises a washer.

13. The assembly of claim 10, wherein an inner diameter of the groove is within a range defined by a nominal thread diameter of the enhanced fatigue nut and the nominal thread diameter of the enhanced fatigue nut plus two thread pitches of the enhanced fatigue nut.

14. The assembly of claim 10, wherein an outer diameter of the groove is within a range defined by a nominal thread diameter of the enhanced fatigue nut plus three thread pitches and the nominal thread diameter of the enhanced fatigue nut plus five thread pitches of the enhanced fatigue nut.

15. The assembly of claim 10, wherein the flanged mating end has an outer diameter that creates a surface area that is within a range of 140% to 200% of the area defined by a nominal thread diameter of the enhanced fatigue nut.

16. The assembly of claim 10, wherein the angled portion of the flanged mating end is disposed at an angle in the range of about 2°–5° with the first line.

17. The assembly of claim 10, further comprising a mid-section disposed between the flanged mating end and an end opposing the flanged mating end, the mid-section having a stiffness relative to the stiffness of the flanged mating end that permits the threads of the enhanced fatigue nut to deflect when mated with the mating component and thereby reduce the limiting stress on the mating component.

18. A method of mechanically connecting, comprising:

providing an enhanced fatigue nut that comprises a body, a threaded interior that has a bottom, an exterior and a flanged mating end for insertion of a threaded mating component, the flanged mating end comprising (i) an annular surface that defines an annular groove, the annular surface having a first portion that extends upward from the bottom to a top of the groove and a second portion that extends downward from the top towards the exterior and below the bottom the first and second portions being angled with respect to an axial centerline through the threaded cylindrical interior, and (ii) an angled flanged surface that extends from the second portion to the exterior, the angled flanged surface being disposed in an angular relationship with the second portion and in an angular relationship with a line that is perpendicular to a centerline through the threaded cylindrical interior, the groove and the angled flanged end causing the threads of the enhanced fatigue nut to deflect when the enhanced fatigue nut is mated with the mating component and thereby causing the limiting stress on the threads of the mating component to be reduced and increasing the fatigue life of the mating component;

contacting the angled flanged surface of the flanged mating end with a first mechanical component so that a gap is created between the flanged mating end and the first mechanical component; and mating the threads of the mating component with the threads of the enhanced fatigue nut and thereby deflecting the enhanced fatigue nut into the gap and distributing a stress on the threads of the second mechanical component to reduce the limiting stress on the threads of the second mechanical component.

\* \* \* \* \*